(12) United States Patent
Chen

(10) Patent No.: US 8,047,654 B2
(45) Date of Patent: Nov. 1, 2011

(54) PROJECTOR WITH REDUCED SPECKLE CONTRAST

(75) Inventor: Chiu-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 456 days.

(21) Appl. No.: 12/417,667

(22) Filed: Apr. 3, 2009

(65) Prior Publication Data

US 2010/0085541 A1    Apr. 8, 2010

(30) Foreign Application Priority Data

Oct. 6, 2008   (CN) .......................... 2008 1 0304740

(51) Int. Cl.
  *G03B 21/00*   (2006.01)
  *G03B 21/14*   (2006.01)
(52) U.S. Cl. ................. 353/31; 353/34; 353/84; 353/98
(58) Field of Classification Search .................... 353/31, 353/34, 37, 84, 98; 348/742, 743; 359/196.1–202.2
  See application file for complete search history.

(56) References Cited

U.S. PATENT DOCUMENTS
5,822,021 A * 10/1998 Johnson et al. ............... 348/742

FOREIGN PATENT DOCUMENTS
JP         2004341105 A * 12/2004

* cited by examiner

*Primary Examiner* — Georgia Y Epps
*Assistant Examiner* — Danell L Owens
(74) *Attorney, Agent, or Firm* — Altis Law Group, Inc.

(57) ABSTRACT

A projector includes a light source module, a diffuser for diffusing the light beam emitting from the light source module, and a fluorescent plate. The light source module includes a light source capable of emitting a first light beam, a dichroic device for diverging the first light beam into a second light beam and a third light beam, and a reflector with a moving frequency exceeding 20 Hz configured for reflecting the third light beam. The fluorescent plate is configured for converting the light beam passing through the diffuser into at least three kinds colored light beams.

19 Claims, 6 Drawing Sheets

PROJECTOR WITH REDUCED SPECKLE CONTRAST

BACKGROUND

1. Technical Field

The present disclosure relates to projectors and, particularly, to a projector with reduced speckle contrast.

2. Description of Related Art

In laser projectors, speckles of an image occur due to the interference of the light emitting from laser light sources. The speckles can mask part or all image display area, negatively affecting the users' viewing experience. Speckles may cause uncomfortable viewing experience for viewers.

What is needed, therefore, is a projector which can overcome or alleviate the above-described problem.

BRIEF DESCRIPTION OF THE DRAWING

Many aspects of the present projector can be better understood with reference to the accompanying drawings. The components in the drawing are not necessarily drawn to scale, the emphasis instead being placed upon clearly illustrating the principles of the present projector.

DETAILED DESCRIPTION OF THE EMBODIMENTS

Embodiments of the present disclosure will now be described in detail below, with reference to the accompanying drawings.

Figure 1:
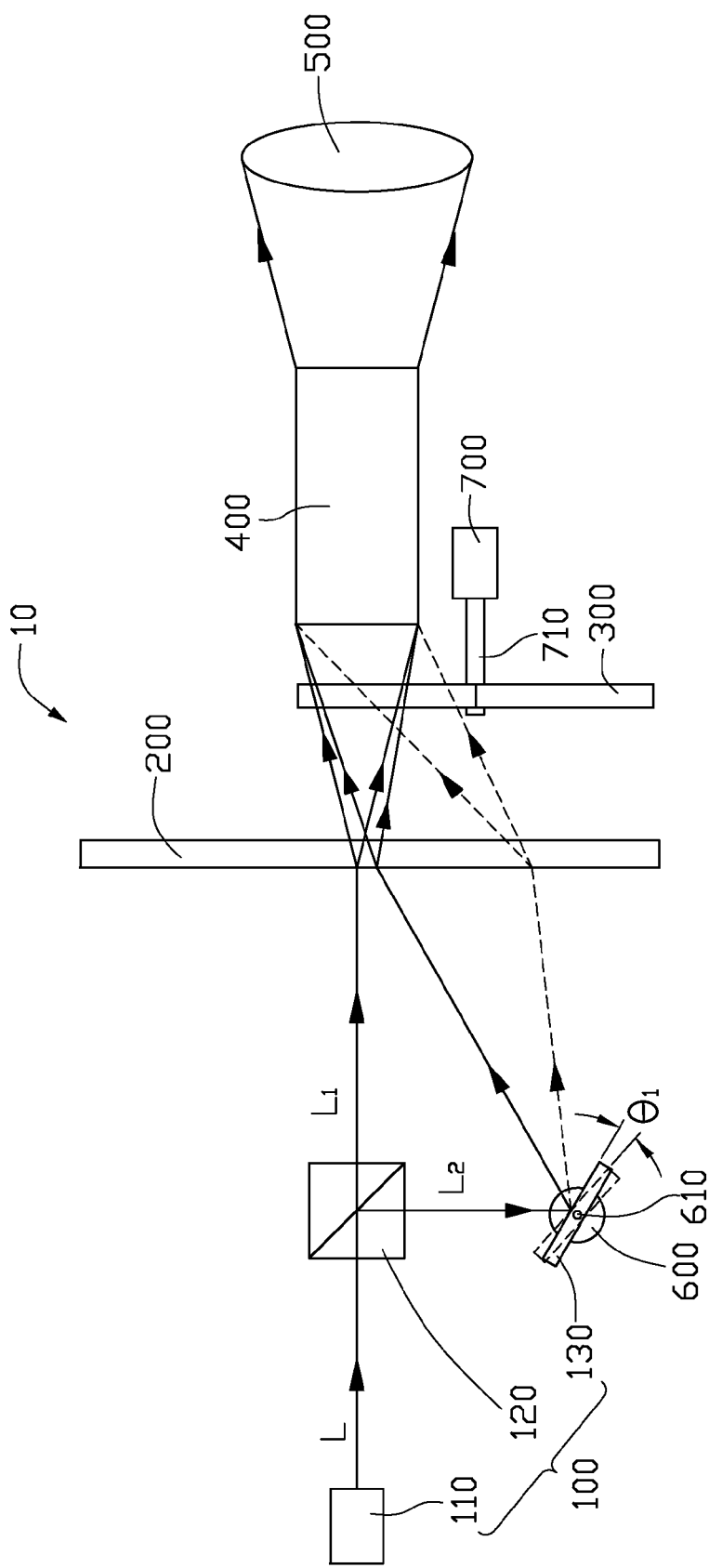
FIG. 1 is a schematic view of a projector including a fluorescent plate according to a first exemplary embodiment.

Referring to FIG. 1, a projector 10, according to a first exemplary embodiment, is shown. The projector 10 includes a light source module 100, a diffuser 200, a fluorescent plate 300, a light tunnel 400, an illumination system 500, a first driver 600, and a second driver 700. The diffuser 200, the fluorescent plate 300, the light tunnel 400, and the illumination system 500 are arranged along the light path of the light beam emitting from the light source module 100 in sequence.

The light source module 100 includes a light source 110, a dichroic device 120, and a reflector 130. The light source 110 is a laser light source, such as a laser diode. The dichroic device 120 is positioned in the light path of a first light beam L emitting from the light source 110 to diverge the first light beam L into a second light beam $L_1$ and a third light beam $L_2$. The intensity ratio of the second light beam $L_1$ to the third light beam $L_2$ can be preset depending on requirements. The second light beam $L_1$ is directed to transmit towards the diffuser 200 along a first direction, and the third light beam $L_2$ is directed to transmit along a second direction, which can be substantially perpendicular to the first direction. The reflector 130 is arranged to reflect the third light beam $L_2$ to the diffuser 200.

The first driver 600 includes a first driving rod 610. The first driving rod 610 is fixed to the reflector 130, to drive the reflector 130 to rotate. The reflector 130 can be swayed by the first driver 600 within a range of a predetermined angle $\theta_1$, such as 5°, with frequency exceeding 20 Hertz (Hz).

The diffuser 200 is configured for diffusing the second light beam L1 and the third light beam L2 emitting from the light source module 100. In this embodiment, the diffuser 200 is a matte glass.

Figure 2:
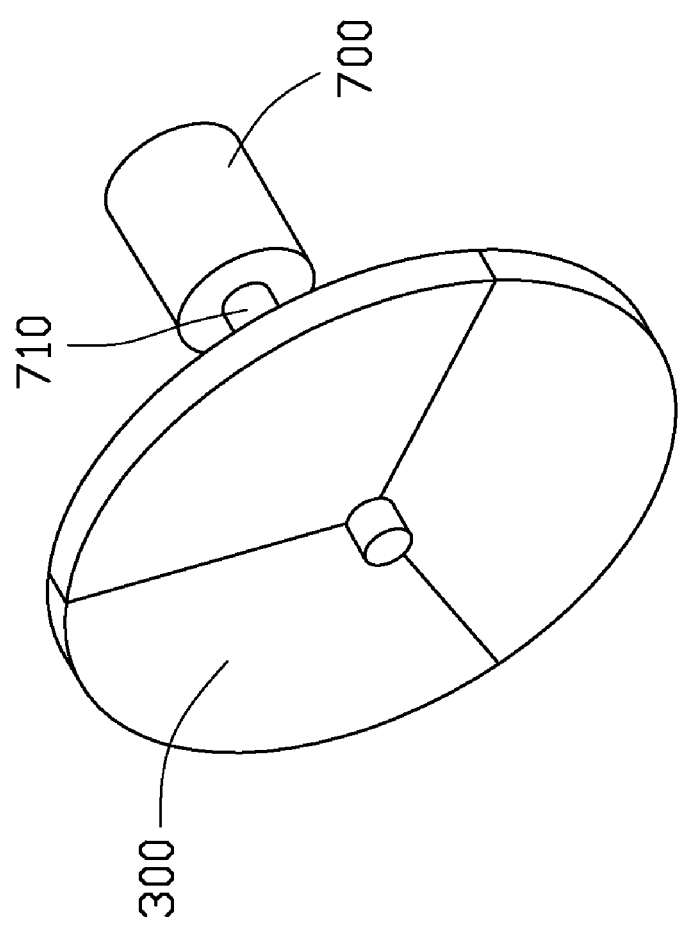
FIG. 2 is a schematic view of the fluorescent plate of the projector of FIG. 1.

Further referring to FIG. 2, in this embodiment, the fluorescent plate 300 is disk-shaped, and includes three sectors covered with three kinds of fluorescent powder. It is understood that, in other embodiment, the number of the sectors of the fluorescent plate 300 can also be four, five, six and so on. The light beam passing through the diffuser 200, can be converted into three different colored light beams, such as red, green and blue, by the three sectors of the fluorescent plate 300 respectively. The three sectors of the fluorescent plate 300 are inserted into the light path of the light beam passing through the diffuser 200 in sequence. Because the red, green and blue light beams converted by the fluorescent plate 300 are usually diffused light, in some embodiments, the diffuser 200 can also be omitted.

The second driver 700 includes a second driving rod 710. The fluorescent plate 300 is fixed on the second driving rod 710 at the center thereof. Such that, the fluorescent plate 300 can be rotated by the second driver 700 about a center axis of the fluorescent plate 300.

The light tunnel 400 normalizes the intensity of the light beam emitted from the fluorescent plate 300 and converted by the fluorescent plate 300 to provide a light beam with uniform brightness.

The illumination system 500 can include a plurality of lenses, the illumination system 500 receives the light beam from the light tunnel 400 and projects the optical images to a screen (not shown).

The reflector 130 of the projector 10 is movable, such as swayed etc. in a range with a frequency exceeding 20 Hz, thus, speckle contrast from the second and third light beams $L_1$, $L_2$ is moved more than 20 Hz and cannot be seen by humans. As a result, the speckle contrast is reduced. Furthermore, by using the fluorescent plate 300 in the projector 10, the projector 10 can project a color image.

Figure 3:
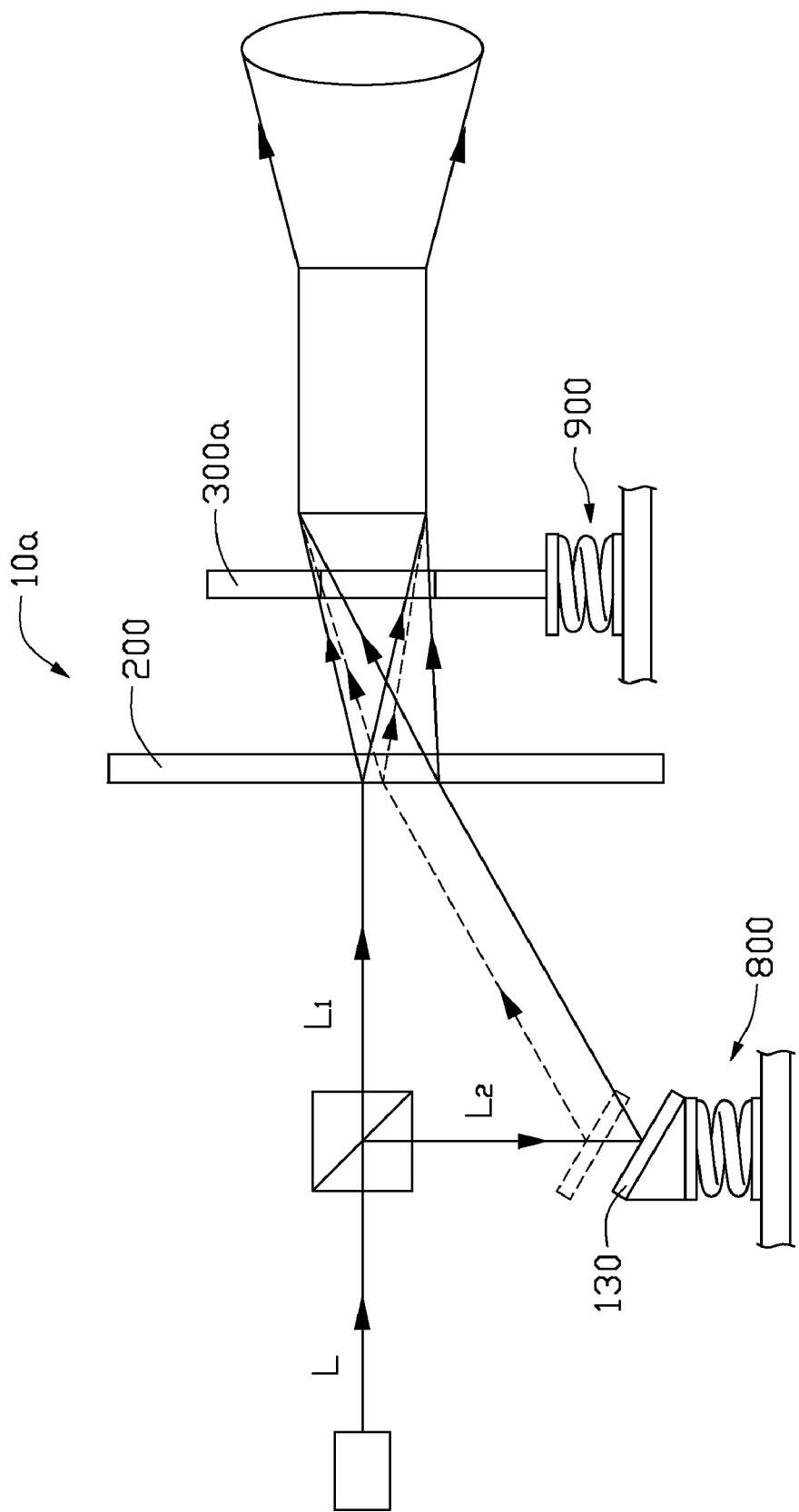
FIG. 3 is a schematic view of a projector including a fluorescent plate according to a second exemplary embodiment.
Figure 4:
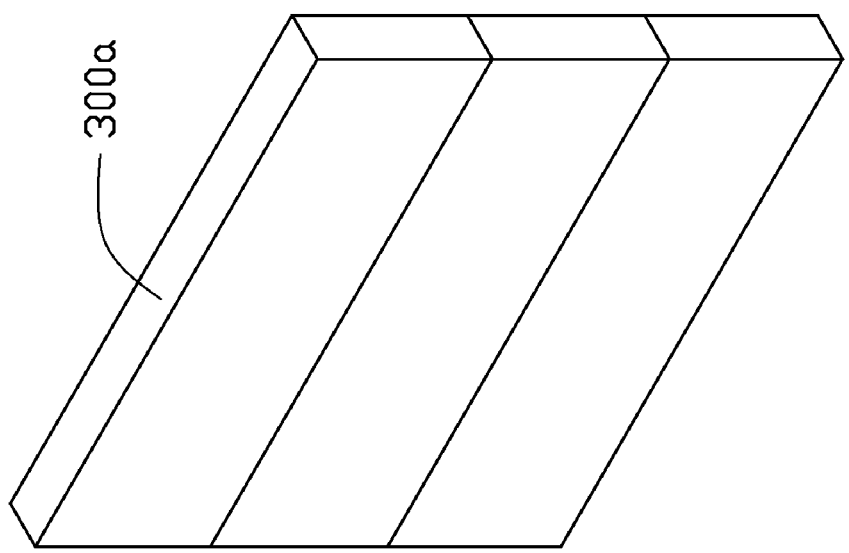
FIG. 4 is a schematic view of the fluorescent plate of the projector of FIG. 3.

Referring to FIGS. 3 and 4, a projector 10a according to a second embodiment is shown. Differing from the projector 10 of the first embodiment, the projector 10a includes a first linear driver 800 instead of the first driver 600, a second linear driver 900 instead of the second driver 700, and a fluorescent plate 300a instead of the fluorescent plate 300. The first linear driver 800 is configured for vibrating the reflector 130 along the light path of the third light beam $L_2$, and the second linear driver 900 is configured for vibrating the fluorescent plate 300a along a direction substantially perpendicular to the light path of the light beam passing through the diffuser 200.

The swing of the reflector 130 can be designed to be small enough to make sure the light beam reflected by the reflector 130 can reach the diffuser 200 and the fluorescent plate 300a. In the present embodiment, the swing of the reflector 130 is in a range from 0 mm to 1 mm. The fluorescent plate 300a is rectangular with three sectors covered with three different kinds of fluorescent powder. The three sectors are arranged on the fluorescent plate 300a along the vibrating direction of the fluorescent plate 300a, therefore, the three sectors can be inserted into the light path of the light beam passing through the diffuser 200 in sequence.

Figure 5:
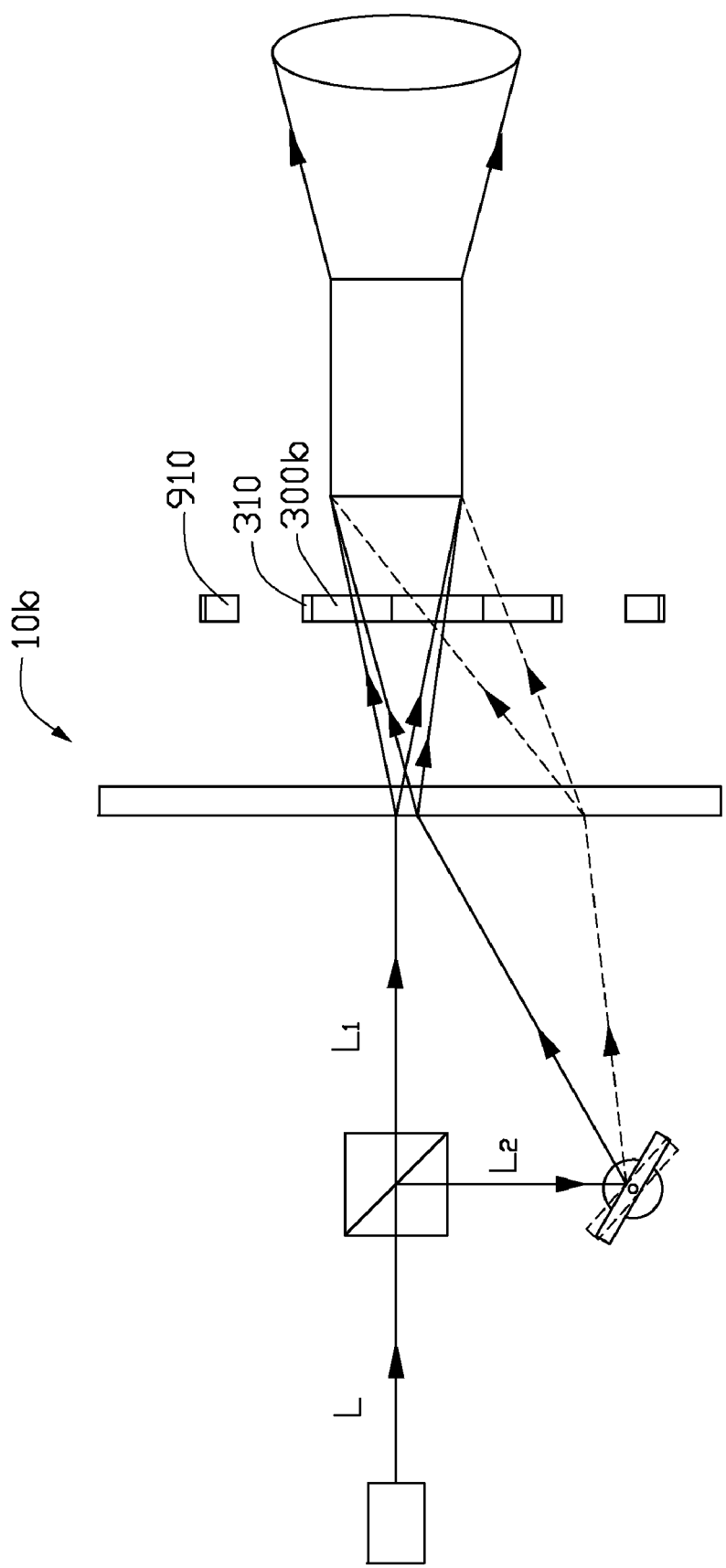
FIG. 5 is a schematic view of a projector including a fluorescent plate according to a third exemplary embodiment.
Figure 6:
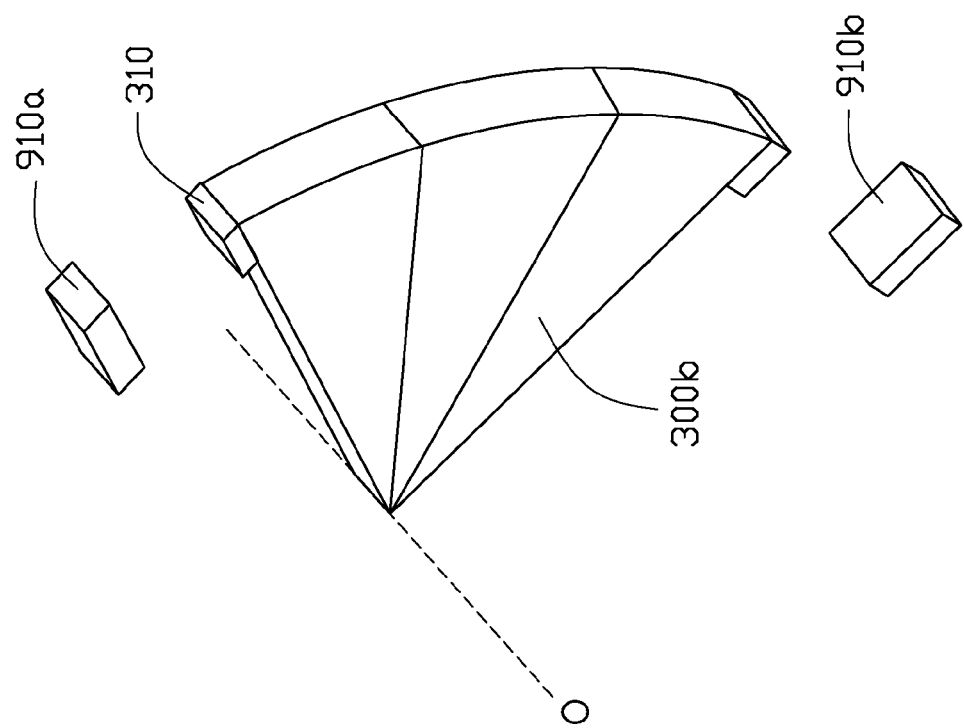
FIG. 6 is a schematic view of the fluorescent plate of the projector of FIG. 5.

Referring to FIGS. 5 and 6, a projector 10b according to a third embodiment is shown. Differing from the projector 10 of the first embodiment, the projector 10b includes a third driver 910 instead of the second driver 700, and a fluorescent plate 300b instead of the fluorescent plate 300. The fluorescent plate 300b is sector-shaped, and can be swayed by the third driver 910 along an axis O. In this embodiment, the third driver 910 includes two electromagnets 910a, 910b. The fluorescent plate 300 includes two magnets 310 corresponding to the two electromagnets 910a, 910b. By changing the polarity of the electromagnets 910a, 910b, the fluorescent plate 300 can be swayed along the axis O.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A projector comprising:
    a light source module, comprising:
        a light source capable of emitting a first light beam;
        a dichroic device positioned in the light path of the first light beam to diverge the first light beam into a second light beam and a third light beam; and
        a reflector with a moving frequency exceeding 20 Hz configured for reflecting the third light beam;
    a diffuser configured for diffusing the second light beam and the third light beam after being reflected by the reflector; and
    a fluorescent plate comprising at least three sectors covered with at least three kinds of fluorescent powder respectively, the at least three sectors being inserted into the light path of the light beam passing through the diffuser in sequence and configured for converting the light beam passing through the diffuser into at least three kinds colored light beams, respectively.

2. The projector as claimed in claim 1, wherein the reflector is moving in swaying manner by a first driver within a range of a predetermined angle.

3. The projector as claimed in claim 2, wherein the predetermined angle is between 0° and 5°.

4. The projector as claimed in claim 1, wherein the reflector is moving in vibrating manner along the light path of the third light beam.

5. The projector as claimed in claim 4, wherein a moving range of the reflector is in a range from 0 mm to 1 mm.

6. The projector as claimed in claim 1, wherein the diffuser is a matte glass.

7. The projector as claimed in claim 1, wherein the fluorescent plate is disk-shaped, and a second driver is capable of rotating the fluorescent plate about a center axis thereof.

8. The projector as claimed in claim 1, wherein the fluorescent plate is rectangular, and the fluorescent plate vibrates along a direction substantially perpendicular to the light path of the light beam passing through the diffuser.

9. The projector as claimed in claim 1, wherein the fluorescent plate is sector-shaped, and is capable of being swayed.

10. The projector as claimed in claim 1, further comprising a light tunnel normalizing the light beam emitted from the fluorescent plate to provide a light beam with uniform brightness.

11. A projector comprising:
    a light source module, comprising:
        a light source capable of emitting a first light beam;
        a dichroic device positioned in the light path of the first light beam to diverge the first light beam into a second light beam and a third light beam; and
        a reflector with a moving frequency exceeding 20 Hz configured for reflecting the third light beam, and
    a fluorescent plate comprising at least three sectors covered with at least three kinds of fluorescent powder respectively, the at least three sectors being in sequence inserted into the light paths of the second light beam passed through the dichroic device and the third light beam reflected by the reflector and configured for converting the second light beam and the third light beam into at least three kinds colored light beams, respectively.

12. The projector as claimed in claim 11, wherein the reflector is moving in swaying manner by a first driver within a range of a predetermined angle.

13. The projector as claimed in claim 12, wherein the predetermined angle is between 0° and 5°.

14. The projector as claimed in claim 11, wherein the reflector is moving in vibrating manner along the light path of the third light beam.

15. The projector as claimed in claim 14, wherein a moving range of the reflector is in a range from 0 mm to 1 mm.

16. The projector as claimed in claim 11, wherein the fluorescent plate is disk-shaped, and a second driver is capable of rotating the fluorescent plate about a center axis thereof.

17. The projector as claimed in claim 11, wherein the fluorescent plate is rectangular, and the fluorescent plate vibrates along a direction substantially perpendicular to the light path of the light beam passing through the diffuser.

18. The projector as claimed in claim 11, wherein the fluorescent plate is sector-shaped, and is capable of being swayed.

19. The projector as claimed in claim 11, further comprising a light tunnel normalizing the light beam emitted from the fluorescent plate to provide a light beam with uniform brightness.

* * * * *